Jan. 16, 1934.  G. W. FORD  1,944,023
HOLDER FOR CINEMATOGRAPH FILMS AND THE LIKE
Original Filed Dec. 2, 1925  2 Sheets-Sheet 1
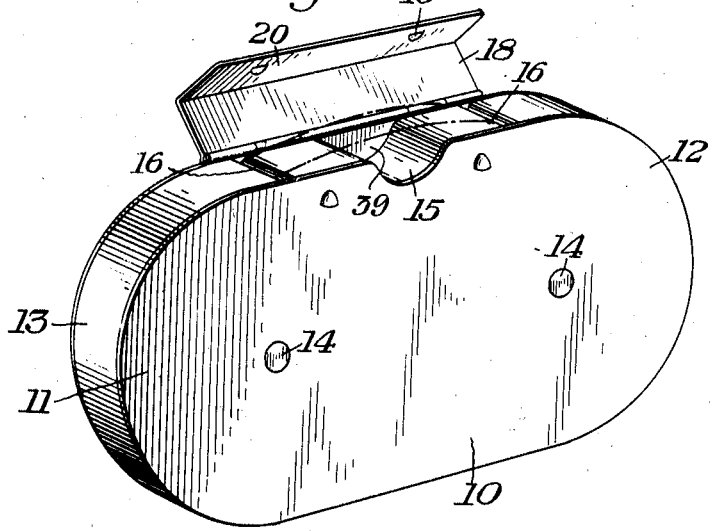
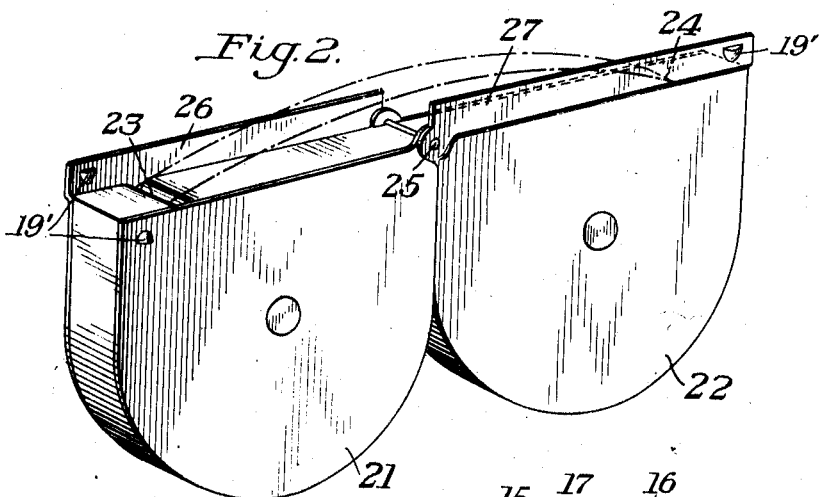
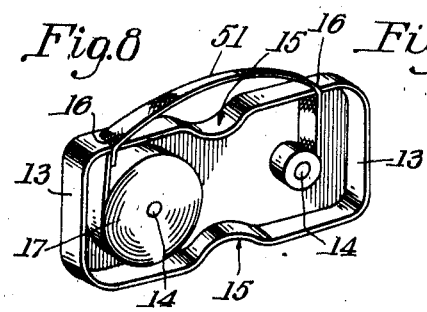
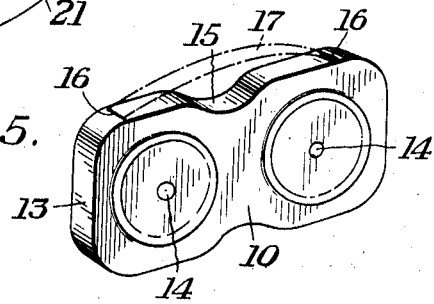
INVENTOR Jan. 16, 1934.   G. W. FORD   1,944,023
HOLDER FOR CINEMATOGRAPH FILMS AND THE LIKE
Original Filed Dec. 2, 1925   2 Sheets-Sheet 2
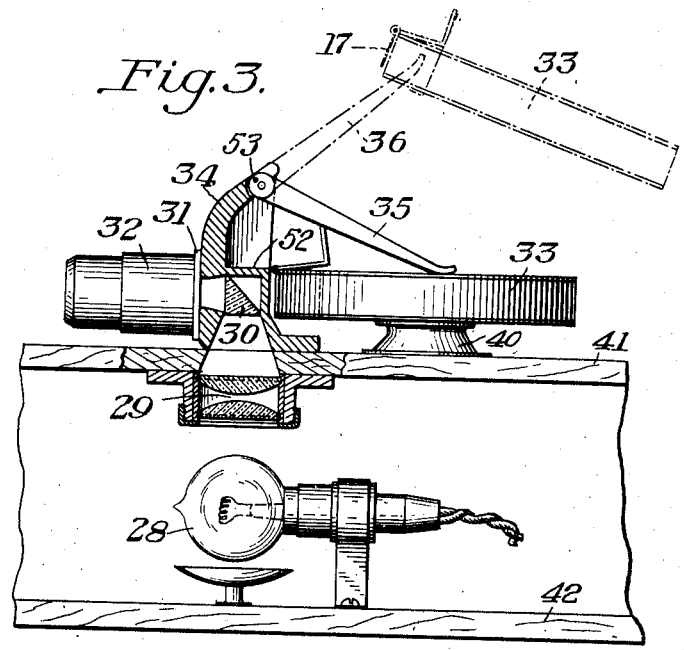
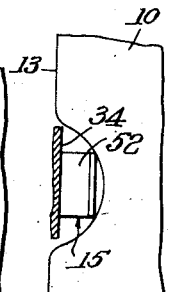
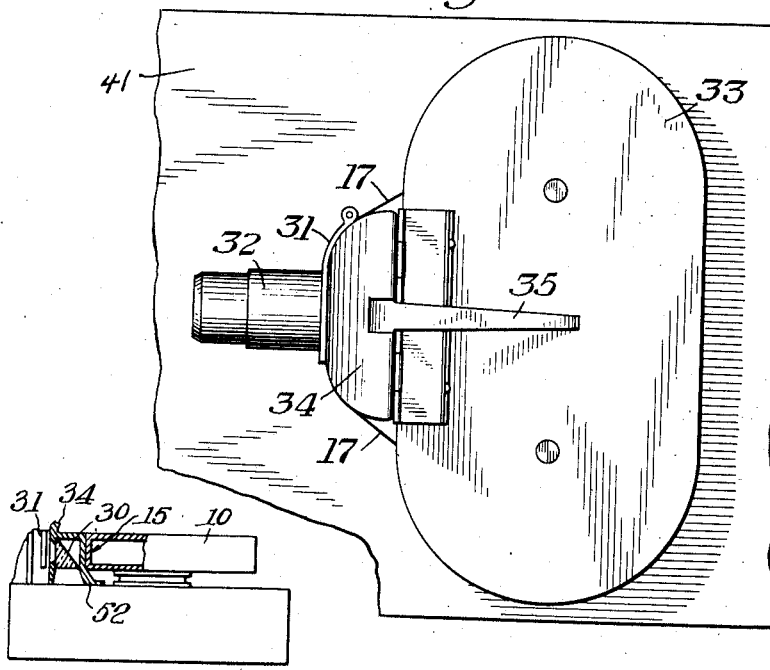
INVENTOR Patented Jan. 16, 1934

1,944,023

UNITED STATES PATENT OFFICE 1,944,023

HOLDER FOR CINEMATOGRAPH FILMS AND THE LIKE

George William Ford, Kensington, London, England, assignor, by mesne assignments, to Kinatome Patents Corporation Application December 2, 1925, Serial No. 72,855, and in Great Britain December 16, 1924. Renewed March 30, 1932

47 Claims. (Cl. 88—17)

This invention is for improvements in or relating to holders or cases for cinematograph films and the like of the type which can be used as a container for the film to protect it during storage or handling, and also serve as its carrier when in use in a projector or camera, the holder being so constructed that it is simply inserted into the cinematograph machine when it is desired to use the film. Such film-holders are constructed as flat boxes in which are mounted two rollers or spools to which the film is permanently attached, and these rollers are so positioned, i. e. with their axes parallel, that the film can be transferred from one to the other without undergoing any twist. The rollers or spools are so formed as to engage with driving devices when the holder is inserted in position in a camera or projector.

Holders of this type as heretofore made have generally been so constructed or shaped as to provide through them a passage for the light when they are placed in a projector; the film extends from one roller or spool to the other, and is arranged to cross the light passage aforesaid. It has heretofore been proposed, for example, to provide two separate casings which are spaced apart to provide the light passage aforesaid, but are rigidly secured together by a bridge-piece having an aperture formed in it; the film being led from one roller out through an opening in its casing past the said aperture and in through an opening in the second casing to the second roller. In other cases there are used two separate casings movable relatively to one another, they being spaced apart when used in a projector or camera and brought closer together when removed therefrom and used for storage purposes so as to reduce the length of film exposed between the openings in the two parts of the casing.

According to the present invention a film-carrying case of the type above described, that is to say, a case wherein the film is mounted on two rollers and which can be used for storage purposes or in a projector or in a camera, is constructed without any light passage through it. When the case is inserted in a projector, a loop of the film is pulled out and inserted in the gate or other mechanism such as intermittent feeding means in such a manner as to permit the beam of light for projection to pass through it. Any suitable means may be used for protecting the exposed portion of the film, and according to another feature of the invention this protection may be afforded by means of an adjustable cover mounted on the case adjacent the exposed portion of the film, the cover being preferably so shaped as to provide a complete enclosure therefor when the film is not in use.

In an alternative arrangement according to this invention, the protection of the film may be effected by connecting the end of the film to either or both of the rollers by means of a strip of material 51, as is clearly shown in Figure 8 of the drawings, which will not suffer damage by exposure, such strip preferably being of fireproof material. With this arrangement, when the film is being stored, it is all wound on to one of the rollers, so that the protective strip aforesaid is caused to extend from one roller out through one of the openings in the casing and in through the other opening of the casing.

According to another feature of the invention, that portion of the outside wall of the casing which is between the two openings in it and against which the exposed portion of the film lies, is provided with a recess or is shaped reentrantly so as to provide access to the rear side of the film. This arrangement facilitates the adjustment of the film when it is being inserted in a cinematograph machine, permitting the easy insertion of the finger of the operator to draw out the film, or its engagement with a suitable guide on the projector by means of which the film is conducted into the gate. The said recess may be closed on one of its sides by an extension of one of the flat walls of the complete casing. Subject matter including such casing is described and claimed in my co-pending application, Serial Number 549,067 filed July 6, 1931, which is a continuation in part, of this application.

In a modified construction according to this invention, the casing is constructed in two parts, say halves, which each carry one of the rollers, and are hinged or otherwise adjustably secured together so that the film is exposed and available for use in one relative setting of the two parts, and in another setting the film is entirely enclosed or substantially so, whereby it is effectively protected during storage.

The two parts aforesaid of the holder may be open-ended containers which constitute each a closure for the other, or they may be substantially closed containers with comparatively small openings for the passage of the film, and these openings are then preferably formed in those walls of the two parts which abut one another when the film-carrying case is adjusted for storage.

This invention also comprises the combination in a cinematograph projector, with a film-carrying case as above set forth, of a reflector which is situated within the loop of film exposed between the two openings in the case, whereby indirect lighting of the film is effected for the purpose of projection. With this arrangement, the source of light can be placed to one side of the film-carrying case and gate mechanism, and a length of film only sufficient to provide accommodation for a small prismatic or other reflector need be drawn out from the casing, such an arrangement being shown in Figures 6 and 7.

If the recess aforesaid be made sufficiently large, the reflector could be accommodated within it so that the extra length of film drawn out when it is being inserted in the projector can be reduced to a minimum.

According to another feature of this invention there is provided in a cinematograph camera or projector, the combination with a film-carrying case as above set forth, of an adjustable finger which constitutes a clamping device for the film-carrying case when in position, and also constitutes a guide which can engage the film and guide it into its desired position when the film-carrying case is being inserted in the camera or projector.

In the accompanying drawings,

Figure 1 is a perspective view showing one construction of film-carrying case in accordance with the present invention;

Figure 2 is a perspective view of a modified construction;

Figure 3 is a view partly in section showing one method of mounting a film-carrying case according to the present invention in a projector;

Figure 4 is a view at right-angles to the plane of Figure 3;

Figure 5 is a perspective view showing a modified construction of case;

Figure 6 is a side view partly in section generally corresponding to Figure 3 with certain parts omitted, and showing the prism and its support disposed within the recess;

Figure 7 is a top plan view of Figure 6 with certain parts broken away; and

Figure 8 shows the strip of protective material.

Like reference characters indicate like parts throughout the drawings.

Referring first to Figure 1, the film-carrying case 10 is a flat shallow container which is preferably made of thin metal. Its sides each consist of flat plates having approximately semi-circular ends 11, 12. These two plates are connected together by a wall forming the edge, i. e. the sides and ends of the container, as indicated at 13. A roller or spool is rotated mounted at the centre of each of the semi-circular portions, and the spindles of these rollers may extend through openings 14 for connection with apparatus whereby they are driven.

On one of the sides of the container there are provided two openings 16, which may have any suitable light-traps such as are customarily used with films, and the film which is secured to each of the rollers aforesaid extends out of one of these openings and in at the other as indicated in chain lines at 17. A sheet metal cover 18 is provided for the casing and is adapted to cover that portion of the edge of the casing along which the film is exposed, so that when the cover is closed down the film is entirely enclosed and protected against risk of fire or other damage.

Preferably the cover 18 is hinged to the case and is provided with any suitable detents or snap-fastenings 19 which will retain it in its closed position, thus acting as a clamp. A recess or notch 15 may be situated between the two openings 16 so that the film 17 extends across it, such notch providing for the easy insertion of the finger of the operator to draw out a length of the film when desired. When this notch is used the cover 18 is preferably provided with a flange 20 which is of such a depth as to constitute a complete closure for the recess when the cover is closed. From an inspection of Figure 1 it will be clearly seen that one of the side walls is extended to form a closure 39 for one side of the recess 15.

Figure 5 shows a modified construction in which no cover is provided for the exposed length of film. The various parts are indicated by the same reference characters as in Figure 1, and if protection for the end of the film (which is outside the casing when used for storage) is desired, the special end-strip above described may be used. Alternatively, that portion of the film may be left blank, so that scratches and like damage are immaterial, and safety against fire can be ensured by making the openings 16 of such size that even if the exposed portion of the film were ignited, the combustion would not spread to that portion of film within the casing, or by making the exposed length of non-inflammable material.

In the construction illustrated in Figure 2, the container is constituted by two separate casings 21, 22. These are preferably constructed each with a flat side and a semi-circular portion so that the flat sides can be fitted together for storage purposes when the container has a form similar to that illustrated in Figure 1. The openings 23, 24 by which the film enters the two parts of the casing respectively are preferably formed on the flat sides aforesaid so that when these flat sides are butted together no part of the film is exposed. Preferably the two openings 23, 24 are so positioned as to register with one another so that the film is in fact entirely enclosed within the two separate chambers 21, 22. These two casings may be hinged together as shown at 25, or any other construction may be provided for adjusting them relatively to one another whereby they can be opened apart so as to expose a length of film between them or can be closed together so as to provide a complete enclosure for the film. In the construction illustrated the two compartments are each provided with a flange, 26, 27 respectively, which extends over the other container when they are closed together, to provide an adequate fastening of the two parts together.

Figures 3 and 4 illustrate certain novel features of construction applied to a cinematograph projector for use with film-carrying-cases as hereinbefore described. Referring to these figures, the source of light 28 may be arranged in a closed chamber situated adjacent the operating unit for the film. The light is passed through a suitable condenser 29 in the wall of the chamber, and is reflected by suitable means such as a prismatic reflector 30 situated immediately behind the gate 31 through which the film is passed. The projecting lens is indicated at 32. With this arrangement it is only necessary to withdraw from the casing a loop of sufficient length to pass through the gate or other mechanism and to receive the reflector within the loop, so that a minimum length of film is exposed even when projecting. The film-case is indicated at 33, and if this case is provided with the notch 15 of Figure 1, the notch may if desired be made sufficiently large to accommodate within it the reflecting means 30 so that the length of film which has to be drawn out, and is thereby exposed, is still further reduced, until it does not exceed the distance between the openings 16 in the case 10.

As clearly shown in Figures 3 and 4 of the drawings, a support 40 is provided for the film case 33, this support being mounted upon the main frame 41 of the apparatus. The light source 28 is shown as mounted upon another and parallel supporting member 42 as is also the conventional reflector for the light source.

In order to facilitate the insertion of the film into the gate, there may be provided a guide-member 34 over which the film is threaded, and as can be seen by inspection of Figures 3 and 4, a portion of which guide member may be so constructed as to serve also as a chamber in which may be mounted the prism 30, and another portion of the guide member may serve as a gate section for cooperation with the gate section 31. According to another feature of the invention this guide-member may be provided with an adjustable finger or extension 35 which can be swung up into the position indicated at 36. This finger can be inserted in the notch 15 behind the film, so that the act of placing the film-carrying-case 33 in position, as indicated by its movement from the position shown in chain lines to the position shown in full lines in Figure 3, automatically directs the film into the gate 31. When this position has been reached, the finger 35 is pushed down to retain the film-carrying-case 33 in its correct position. Any suitable spring-control may be provided on this finger 35 to hold it in the two positions to which it is adjustable.

As can be readily seen from an inspection of Figures 3, 6, and 7, the guiding surface 34 may be embodied in a unitary structure which includes both the support for the prism 30, which includes a rearward supporting portion 52, having horizontal and vertical portions extending to the right horizontally and then downwardly vertically to engagement with the main frame 41 of the apparatus, and an apertured film-guiding portion contiguous to the first mentioned guiding surface and disposed parallel to the front gate section 31 and engaging the side of the film other than that engaged by section 31, all as viewed in Figures 3, 6 and 7.

It will be appreciated that this arrangement may be used when inserting the film into a camera instead of into a projector; in such a case, of course, the source of light 28 and prismatic reflector 30 are omitted, but the construction of the parts 31, 34, 35 is similar to that described above. When my magazine is thus used with a camera and certain structure placed within the recess 15 as previously described, the prism 30 as shown in Figure 6 will of course be omitted. A conventional shutter 43 may be provided, and may be operated in any well known way. Since this part and other similar and conventional parts of the cinematograph machine form no part of the present invention, they are not described.

An important advantage of the film-carrying-case constructed in accordance with this invention is that the overall dimensions of the case can be reduced to a minimum, for the axes of the rollers can be arranged a shorter distance apart in the casing than in the film-carrying holders above described, since there is no need to provide space for the light passage through the film-case. Furthermore, it will be appreciated that the axes of the two rollers may be spaced apart a distance less than twice the distance of either roller from the adjacent semi-circular end of the casing, since the full length of the film is either wound on one roller or distributed between the two rollers; if flanges are provided on these rollers, the flanges may overlap one another while still providing adequate accommodation for the film.

Further, it will be seen that this film-carrying-case lends itself particularly to the use of indirect or reflected illumination of the film, which arrangement is advantageous in reducing the length of film which is exposed during its use.

The film-carrying-case hereinbefore described may be so constructed that after the film has been inserted in it it is permanently closed, since there will be no need to obtain access to the interior during the normal use of the container. It also lies within the scope of this invention, however, to arrange the containers so that they may be opened, for example by making one of the flat walls detachable.

It will be appreciated that the invention is not limited to the specific constructions hereinbefore described, and also that other details of construction of film-carrying-cases such as are necessitated by the conditions of use and are commonly employed, may be used in connection with the present invention, and have not herein been described in detail.

Finally, it is to be understood that the expression "cinematograph films and the like" is intended to cover any films for use in a camera or projector, and whether used for motion pictures or still pictures.

I claim:

1. A container for film, comprising film containing sections between which a length of film extends pivotally connected adjacent one edge, and formed with substantially straight sides adapted to abut in closed position to protect the length of the film extending between said sections, and with other sides adapted to abut in open position to limit the opening movement of the sections.

2. A container for film, comprising film containing sections between which a length of film extends pivotally connected adjacent one edge, and formed with substantially straight sides adapted to abut in closed position to protect the length of the film extending between said sections, and with other sides adapted to abut in open position to limit the opening movement of the sections and substantially seal the space therebetween.

3. A container for film comprising film containing sections between which a length of the film extends pivotally connected adjacent one edge and formed with sides adapted to abut in closed position for completely protecting the film and with other sides adapted to abut in open position to limit the opening movement of the sections, and means for holding such sections in such protecting relation.

4. A container for film comprising film containing sections between which a length of film extends pivotally connected adjacent one edge and formed with sides adapted to abut in closed position for completely protecting the film and with other sides adapted to abut in open position to limit the opening movement of the sections, and a detent arranged to maintain said sections in protecting relation after such sections have been moved into such relation.

5. A container for film comprising two sections, a pivotal connection joining adjacent edges of such sections, said sections being formed with sides adapted to abut in closed position for completely protecting the film, and with other sides adapted to abut in open position to limit the opening movement of the sections, a film supporting member in each section and an opening in one of the sides thereof, said members and openings being so disposed that a film which is wound upon the member in one section may be passed through the cooperating opening of said section and exteriorly thereof and extended therefrom through the corresponding opening of the other of said sections and attached to the member therewithin, said openings being so disposed relatively to each other and to said connection that when said sections are disposed in such protecting positions said openings are adjacent.

6. In a film holder, the combination of two substantially closed containers, each of said containers being constructed of two parallel flat sides and of sides disposed at right angles to such parallel sides for connecting the same, a film supporting member in each container and an opening in each of said second mentioned sides, said members and said openings being so disposed that a film which is wound upon the member in one compartment may be passed through the cooperating opening and exteriorly thereof and extended through the corresponding opening of said other compartment and attached to the member therewithin, said containers being hingedly connected to each other whereby said containers can be moved to a first position wherein a length of film is disposed between said openings for projection or exposure or to a second position wherein such second mentioned sides are in adjacent relation to each other for storage or shipment, and extensions from said flat sides so disposed that when said containers are in such second mentioned position said extensions from one compartment cooperate with said flat sides of said other compartment to form an enclosure therebetween which protects that section of the film which extends between said openings.

7. As an article of manufacture, a film carrying case characterized by the absence of any light passage therethrough whereby the entire portion of the film within said case is protected, said case being adapted to be inserted into photographic apparatus for supporting the film carried thereby during the projection or exposure of the same and removed therefrom for storage or shipment of the film, said case being provided with means for supporting each of the coils of the film and said case having walls to protect both of said coils of the film, said case having aligning openings so disposed in one of said walls that a portion of that section of the film which extends between the coils may be exposed between said openings, and a movable cover mounted upon said case adjacent said openings and extending therebetween and movable to one position wherein it cooperates with the adjacent portion of said wall wherein said openings are disposed to enclose the length of film between said openings whereby the film extending therebetween is protected during storage or shipment and to another position wherein it is relatively distant from such length of film whereby the film may be projected or exposed.

8. A film holder for housing the winding-off coil and the take-up coil of a film and having a portion at which the film extends outside the holder for engagement with film contacting means of a film handling apparatus, in combination with a guard mounting structure formed upon said holder, a guard for the portion of the film which extends outside of the holder, and means for mounting said guard and said mounting structure in operative relation to each other to connect said guard and said mounting structure for the movement of said guard relatively to said holder between one position wherein it exposes said external film portion for engagement by said film contacting means of said apparatus and to another position wherein it covers and protects said external portion of the film.

9. A film holder for housing the winding-off coil and the take-up coil of a film and having a wall provided with spaced aligning openings through which a portion of the film extends exteriorly of the holder for engagement with film contacting means of a film handling apparatus, in combination with a guard for the portion of the film extending between said openings, and means for movably mounting said guard on the holder for movement to one position upon said holder wherein it clears said external film portion whereby said external film portion may be engaged by the film contacting means of said apparatus and to another position upon said apparatus wherein it covers and protects one side of said external film portion, the other side of said film portion being protected by said portion of said wall opposite thereto.

10. A film holder for housing the winding-off coil and the take-up coil of a film and having a wall provided with spaced aligning openings through which a portion of the film extends exteriorly of the holder for engagement with film contacting means of a film handling apparatus, in combination with a guard for the portion of the film extending between said openings, said guard consisting of a member including two substantially right-angled protective portions, and means for movably mounting said guard on the holder for movement to one position upon said holder wherein it clears said external film portion whereby said external film portion may be engaged by the film contacting means of said apparatus and to another position upon said apparatus wherein one of said right-angled protective portions covers and protects one side of said external film portion, the other side of said film portion being protected by said portion of said wall opposite thereto, the other of said substantially right-angled protective portions protecting an edge of the film.

11. A film holder constructed to house the winding-off reel and the take-up reel and having an external recess across which a portion of the film is adapted to travel on its way from one reel to the other, exteriorly of the holder, and a guard adapted to cover said recess.

12. A film holder constructed to house the winding-off reel and the take-up reel and having an external recess across which a portion of the film is adapted to travel on its way from one reel to the other, exteriorly of said holder, and a guard mounted to move on said holder from a position in which said guard covers said recess to another position in which it clears such recess.

13. A film holder constructed to house the winding-off reel and the take-up reel and having an external recess across which a portion of the film is adapted to travel on its way from one reel to the other, exteriorly of the holder, and a guard mounted on said holder to swing from a position in which said guard covers said recess to another position in which it clears said recess and is stopped by engaging a wall of the holder.

14. A film holder constructed to house the winding-off reel and the take-up reel and having spaced and aligning openings in a side wall thereof and a recess formed in said side wall between said openings thereby exposing a length of film exteriorly of the holder as it travels from one reel to the other, and a guard adapted to cover said recess and the exposed length of the film.

15. A film holder constructed to house the winding-off reel and the take-up reel and having spaced and aligning openings in a side wall thereof and a recess formed in said side wall between said openings thereby exposing a length of film exteriorly of the holder as it travels from one reel to the other, and a guard mounted to move on said holder from a position in which said guard covers said recess to another position in which it clears said recess.

16. As an article of manufacture, a film carrying case adapted to be inserted into photographic apparatus and removed therefrom for storage of the film, said case being of the type which is characterized by the absence of any light passage through the case whereby the film within said case is protected, said case being provided with means for carrying each of the coils of the film and having top, bottom and side walls to protect both coils of the film, one of said side walls having openings therein for exposing a length of that section of the film which extends between the coils and being formed with a recess in a portion thereof disposed between said openings, said openings being so disposed in relation to each other and to said recess that the film extends therebetween across said recess, and a movable cover mounted upon said wall and so positioned adjacent said recess and extending between said openings and so formed and so disposed as to cooperate with said wall adjacent said recess to enclose at will said recess and the length of film between said openings.

17. As an article of manufacture, a film carrying case adapted to be inserted into photographic apparatus and for the exposure or projection of the film carried thereby or removed therefrom for storage of the film, said case being provided with means for carrying each of the coils of the film and having substantially parallel top and bottom walls joined by side walls at substantially right angles thereto to protect both coils of the film, one of said side walls having aligning openings therein for exposing a length of film between the coils and being formed with a re-entrant curve forming a recess in a portion thereof disposed between such openings, and a movable cover mounted upon a hinged connection disposed adjacent the edge of one of said parallel walls adjacent such recess and upon an axis parallel to the path of the film extending between such openings and extending between said openings and adapted to cooperate with adjacent portions of the case to enclose at will such recess and the length of film extending between such openings.

18. As an article of manufacture, a flat film carrying case adapted to be inserted into photographic apparatus for the exposure or projection of the film carried thereby or removed therefrom for the storage of the film, said case being provided with means for carrying each of the coils of the film and having two parallel top and bottom walls joined by side walls at substantially right angles thereto to protect both coils of the film, one of said side walls having aligning openings therein for exposing a length of film between the coils and being formed with a re-entrant curve which provides a recess in a portion thereof disposed between such openings, one of said parallel walls being extended within the space between the planes of the outer surfaces of said walls beyond such re-entrant curve to form a closure for one side of such recess.

19. As an article of manufacture, a film carrying case adapted to be inserted into photographic apparatus for the exposure or projection of the film carried thereby or removed therefrom for the storage of the film, said case being provided with means for carrying each of the coils of the film and having two parallel top and bottom walls joined by side walls at substantially right angles thereto to protect both coils of the film, one of said side walls having aligning openings therein for exposing a length of film between the coils and being formed with a re-entrant curve which forms a recess in a portion thereof disposed between such openings, one of said parallel walls being extended beyond such re-entrant curve to form a closure for one side of such recess, a cover, and means disposed upon said case adjacent said openings for movably mounting said cover thereupon so that said cover extends between said openings and is movable from and to a position wherein it cooperates with the adjacent portion of said case to form a closure for the other two sides of such recess.

20. As an article of manufacture, a film carrying case adapted to be inserted into photographic apparatus for the exposure or projection of the film carried thereby or removed therefrom for the storage of the film, said case being provided with means for carrying each of the coils of the film and having two parallel top and bottom walls joined by side walls at substantially right anges thereto to protect both coils of the film, one of said side walls having aligning openings therein for exposing a length of film between the coils and being formed with a re-entrant curve which forms a recess in a portion thereof disposed between such openings, one of said parallel walls being extended beyond such re-entrant curve to form a closure for one side of such recess, and a movable cover hingedly attached to said case adjacent to that portion of said last previously mentioned parallel side wall which is extended beyond such re-entrant curve to form a closure for one side of such recess and movable upon an axis parallel to the length of film extending between said openings and adapted to cooperate with the portion of said case adjacent said openings and enclose at will such recess and the length of film between such openings.

21. As an article of manufacture, a film carrying case adapted to be inserted into film handling apparatus and removed therefrom for storage of the film, said case being of the type which is characterized by the absence of any light passage through the case whereby the film therewithin is protected, said case being provided with means for carrying both coils of the film and having top, bottom, and side walls to protect both coils of the film, one of said side walls having aligning openings therein through which a section of that portion of the film which extends between said coils is passed thereby exposing it without said case, said side wall being formed with a recess in a portion thereof disposed between said openings, the portion of said side wall forming said recess being disposed opposite to said exposed section of the film thereby protecting one side thereof, a protective member disposed adjacent an edge of said recess and extending between said openings and mounted for movement from and to a protective position adjacent the side of said exposed section of the film opposite to the side which is protected by the portion of said side wall which forms said recess whereby said protective member protects said opposite side of the film, and means for closing the edge portions of said recess when said protective member is disposed in said protective position whereby the previously exposed section of the film is completely enclosed and protected.

22. As an article of manufacture, a film carrying case adapted to be inserted into photographic apparatus and removed therefrom for storage of the film, said case being of the type which is characterized by the absence of any light passage through the case whereby the film therewithin is protected, said case being provided with means for carrying both coils of the film and having top, bottom, and side walls to protect both coils of the film, one of said side walls having aligning openings therein through which a section of that portion of the film which extends between said coils is passed thereby exposing it without said case, said side wall being formed with a recess in the portion thereof disposed between said openings, the portion of said side walls forming said recess being disposed opposite to said exposed section of the film thereby protecting one side thereof, and a protective member disposed adjacent said recess and extending between said openings and mounted for movement from and to a protective position adjacent the side of said exposed section of the film opposite to the side which is protected by the portion of said side wall which forms said recess whereby said protective member protects said opposite side of the film.

23. A film holder constructed to house the winding-off reel and the take-up reel and composed of two companion members, said holder having an external recess across which a portion of the film is adapted to travel on its way from one reel to the other, exteriorly of the holder, and a guard constructed to connect said two members and mounted to move on said holder from a position in which said guard covers said recess to another position in which it clears such recess.

24. A substantially flat film holder constructed to house the winding-off coil and the take-up coil and consisting of separable members, said separable members including two flat parallel members and a side member at right angles to said parallel members, one of said parallel members being detachable, and said side member having spaced and aligning openings through which the film extends outside of the holder, in combination with a guard adapted to cover and protect said external film portion and at the same time connect said flat parallel members.

25. A film holder constructed to house the winding-off coil and the take-up coil of a film and including a member which is detachable from the remainder of said holder whereby upon the detachment of said member a film may be placed within the holder or removed therefrom and having a portion of a wall opposite which the film extends outside of the holder for engagement by film contacting means of a film handling apparatus, in combination with a clamp and means for mounting said clamp upon said holder for movement between one position upon said holder wherein it engages both said detachable member and the remainder of said holder and at the same time protects said external portion of the film and another position wherein it clears said external film portion whereby said portion may be engaged by said film contacting means.

26. In combination, a film magazine and a film projector, said magazine comprising two compartments pivotally connected with each other and so constructed and arranged that when disposed in one relation to each other they expose a length of film therebetween and prevent the passage of light therebetween and when disposed in another relation to each other they provide complete protection for the film therein contained, and said projector including a support, an apertured member, a reflector and a source of light, said support being so constructed and arranged that said magazine may be mounted thereupon when said compartments are disposed in such first mentioned relation, said apertured member being adapted to define a path through which such length of exposed film may be fed when said magazine is mounted upon said support and thereby placed in assembled relation with said apparatus, and said light reflector being disposed between such aperture and the position occupied by the periphery of said magazine when said magazine is placed in such assembled relation, and such source of light being so disposed that light therefrom is directed upon said reflector and therefrom through the film.

27. In combination, a film casing and a film handling apparatus, said film casing exposing a length of film while enclosing portions on opposite sides of such exposed length, and said apparatus including a fixed guide positioned thereupon and defining a predetermined path for such exposed length of film, a support for such casing positioned upon said apparatus adjacent said guide, and a movable finger upon said guide for movement into one position wherein it cooperates with such length of film as said casing is being placed upon said support whereby said finger guides the film into relation with said member and said member guides the film into such path or to a second position wherein it bears upon said casing for maintaining said casing upon said support after it has been mounted thereupon.

28. In combination, a film carrying member and a film handling apparatus, said apparatus comprising a support for said member, a gate through which a film carried by said member may be fed, and operable guiding means, said guiding means being adapted to cooperate with said support, said gate, and said member and being positioned adjacent said gate and having a portion movably mounted for disposition in one position wherein it guides the film carried by said member into said gate while said member is being placed upon said support and in another position wherein it clamps said member upon said support after it has been placed thereupon.

29. In combination, a film containing magazine and a film handling apparatus, said magazine including film carrying means disposed therewithin, edge walls constructed with openings to permit the passage of film therethrough to provide a length of film therebetween exteriorly of said magazine, a support for said magazine upon said apparatus so arranged that said magazine may be mounted in a predetermined position thereupon, a member defining a path through which such exposed length of film may be fed when said magazine is positioned upon said support, light reflecting means positioned between such path and such predetermined position for said magazine upon said apparatus, a lens for directing light upon said reflecting means, and means disposed upon said apparatus and so constructed and arranged as to guide the film into operative relation with said member during the positioning of said magazine upon said support whereby the film is disposed in such path and in cooperative position relative to light passed thereto from said lens by said reflecting means.

30. In combination, a film containing magazine and a film projecting apparatus, said magazine including film carrying means disposed therewithin, edge walls constructed with openings to permit the passage of film therethrough to provide a length of film therebetween exteriorly of said magazine, a support for said magazine upon said apparatus so arranged that said magazine may be mounted in a predetermined position thereupon, a member defining a path through which such exposed length of film may be fed when said magazine is positioned upon said support, light reflecting means positioned between such path and such predetermined position for said magazine upon said apparatus, a source of light cooperating with said reflecting means, and means disposed upon said apparatus and so constructed and arranged as to guide the film into operative relation with said member during the positioning of said magazine upon said support whereby the film is disposed in such path and in cooperative position relative to light passed thereto from said source by said reflecting means.

31. In combination, a film container and a film handling apparatus, said film container having openings between which a length of film is exposed, and said film handling apparatus including a main frame, a support upon said frame for said film container, an apertured member positioned upon the same side of said frame as said support and adjacent thereto and so constructed and arranged that it assists in laterally positioning such length of film when said container is being placed upon said support and that it longitudinally guides the film during the feeding of the same after said container has been placed upon said support, light reflecting means disposed upon said frame between said support and the aperture of said member, a source of light for said reflecting means disposed upon the opposite side of said frame from that upon which said container is disposed, and an objective lens cooperating with such aperture and disposed upon the side of such aperture opposite that upon which said reflecting means is disposed.

32. In combination, cinematographic apparatus and a film carrying case for use therewith, said case comprising a substantially flat container having parallel top and bottom walls joined by side walls at substantially right angles thereto, one of said side walls having aligning openings therein for exposing a length of film therebetween and being formed with a recess in said last previously mentioned side wall between such openings across which such exposed length of film extends, said apparatus including means for predeterminedly positioning said case thereupon, a supporting body so disposed upon said apparatus in relation to said positioning means that upon the placing of said case upon said positioning means said supporting body is situated within such recess formed in said side wall, and a film contacting and guiding surface supported by said supporting body immediately in front thereof whereby the film, when said case is placed upon said apparatus with the film extending between said openings and in contact with said surface, is not materially displaced from a straight line.

33. In combination, a film containing magazine and a film handling apparatus, said magazine including edge walls constructed with aligning openings to permit the passage of film therebetween exteriorly of said magazine, said edge walls being characterized by a recess formed therein between such openings, a support for said magazine upon said apparatus so arranged that said magazine may be mounted in a predetermined operative position thereupon, a supporting structure so placed upon said apparatus in relation to said magazine-support that while said magazine is positioned upon said support said supporting structure is situated within said recess, means for longitudinally moving the film across said recess, a film contacting and guiding surface supported upon said supporting structure immediately in front thereof and adjacent the outer periphery of said recess, and means for continuously maintaining said film contacting and guiding surface in contacting and guiding relation to the film during the longitudinal movement thereof.

34. In combination, a film containing magazine and a film handling apparatus, said magazine including edge walls constructed with aligning openings to permit the passage of film therebetween exteriorly of said magazine, said edge walls being characterized by a recess formed therein between such openings, a support for said magazine upon said apparatus so arranged that said magazine may be mounted in a predetermined operative position thereupon, light reflecting means adapted for directing light in relation to the film so placed upon said apparatus in relation to said support that while said magazine is positioned upon said support said light reflecting means is situated within said recess, and an apertured path defining member disposed immediately in front of said light reflecting means adjacent the outer periphery of said recess.

35. In combination, a film containing magazine and a film handling apparatus, said magazine including edge walls constructed with aligning openings to permit the passage of film therebetween exteriorly of said magazine, said edge walls being characterized by a recess formed therein between such openings, a support for said magazine upon said apparatus so arranged that said magazine may be mounted in a predetermined operative position thereupon, a supporting structure so placed upon said apparatus in relation to said magazine-support that while said magazine is positioned upon said support said supporting structure is situated within said recess, means for longitudinally moving the film across said recess, a film contacting and guiding surface supported upon said supporting structure immediately in front thereof and adjacent the outer periphery of said recess, means for maintaining said film contacting and guiding surface in contacting and guiding relation to the film during the longitudinal movement thereof, and means disposed upon said apparatus for guiding the film into operative position relatively to said film contacting and guiding surface during the placing of said magazine upon said support.

36. In combination, a film container and a cinematographic apparatus, said film container including edge walls constructed with aligning openings between which a length of film is exposed and being formed with a recess between such openings, and said apparatus including a main frame, a support upon said frame for said film container, light reflecting means positioned upon the same side of said frame as said support and adjacent thereto and so disposed in relation to said support that said means is situated within said recess after said container has been placed in cooperative relation with said apparatus, a guiding member formed with an aperture therein and placed upon said apparatus immediately in front of said light reflecting means and in cooperative relation thereto, and a source of light for said reflecting means disposed upon the opposite side of said frame from that upon which said support is placed.

37. In combination, a film containing magazine and a film handling apparatus, said magazine including edge walls constructed with aligning openings to permit the passage of the film therebetween exteriorly of the magazine, said edge walls being characterized by a recess formed therein between such openings, a support for said magazine upon said apparatus so arranged that said magazine may be mounted in a predetermined operative position thereupon, light reflecting means adapted for directing light in relation to the film so placed upon said apparatus in relation to said support that while said magazine is positioned upon said support said light reflecting means is situated within said recess, a lens cooperating with said light reflecting means for directing light in respect to the film, and means disposed upon said apparatus for guiding the film into operative position relative to said light reflecting means during the placing of said magazine upon said support whereby the film is disposed in cooperative relation to light passed by said reflecting means.

38. In combination, film handling apparatus and a film carrying case for use therewith, said case comprising a substantially flat container having parallel top and bottom walls joined by side walls at substantially right angles thereto, said side walls having aligning openings therein for exposing a length of film therebetween and being formed with a recess between such openings across which such exposed length of film extends, said apparatus including means for maintaining said case in a predetermined operative position thereupon, an apertured gate section for cooperating with the length of film extending between such openings across said recess, a prism positioned adjacent the aperture of said gate section, and a source for passing light to said prism for deflection thereby to said aperture, said prism being so disposed upon said apparatus in relation to said positioning means that it is situated substantially within such recess formed in said side wall and between said openings therein while said case is maintained in such predetermined position and said gate section being disposed immediately in front of said prism.

39. In combination, a film containing magazine and a film handling apparatus, said magazine including edge walls constructed with aligning openings to permit the passage of the film therebetween exteriorly of the magazine, said edge walls being characterized by a recess formed therein between such openings, a support for said magazine upon said apparatus so arranged that said magazine may be mounted in a predetermined operative position thereupon, light reflecting means adapted for directing light in relation to the film so placed upon said apparatus in relation to said support that while said magazine is positioned upon said support said light reflecting means is situated within said recess, a source of light cooperating with said light reflecting means for directing light in respect to the film, and means disposed upon said apparatus for guiding the film into operative position relative to said light reflecting means during the placing of said magazine upon said support whereby the film is disposed in cooperative relation to light passed by said reflecting means.

40. In a film handling apparatus, in combination, a film carrying case having parallel top and bottom walls joined by side walls at substantially right angles thereto, a first supporting member for a reel of film to be unwound therefrom, a second supporting member on which the film may be wound, a film passage way from one of said side walls adjacent said first film supporting member, an aligning film passage way from said previously mentioned side wall adjacent said second film supporting member, and a re-entrant depressed portion in said side wall between said openings, said re-entrant portion being compactly disposed relatively to the valley between the portion of the film within said container being unwound from said first supporting member and the portion being wound on said second film supporting member, a support upon said apparatus for said container, a supporting structure so disposed in relation to said supporting means that it is positioned within the space adjacent said case and exterior thereto which is provided by the arrangement of said depressed re-entrant side wall portion, a film contacting and guiding surface disposed immediately in front of said supporting structure, means for longitudinally moving the film across the mouth of said recess, and means for maintaining said contacting and supporting structure in supporting and contacting relation to the film during the feeding thereof, whereby a film which is carried by said container and passes in the aligning film passage ways in said side wall is guided across the mouth of said recess during the longitudinal movement thereof.

41. In combination, cinematographic apparatus and a film carrying case for use therewith, said case comprising a substantially flat container having parallel top and bottom walls joined by side walls at substantially right angles thereto, one of said side walls having aligning openings therein for exposing a length of film therebetween and being formed with a recess in said last previously mentioned side wall between such openings across the side opening of which recess such exposed length of film extends, said apparatus including means for predeterminedly positioning said case thereupon, means for feeding the film across said recess, and film guiding means, said film guiding means including a film contacting and guiding member, and means for mounting said member upon said apparatus in such relation to said positioning means that while said case is disposed upon said positioning means and said film is fed across said recess said film contacting member is disposed between the film and the side opening of said recess and closes said side opening and contacts and guides the film between said aligning openings.

42. In combination, cinematographic apparatus and a film carrying case for use therewith, said case comprising a substantially flat container having parallel top and bottom walls joined by side walls at substantially right angles thereto, one of said side walls having aligning openings therein for exposing a length of film therebetween and being formed with a recess in said last previously mentioned side wall between such openings across the side opening of which recess such exposed length of film extends, said apparatus including means for predeterminedly positioning said case thereupon, means for longitudinally feeding the film across said recess, and a sectional gate, said gate comprising a first gate member for guiding such exposed length of film from one of said openings toward the other, and means for so mounting said first gate member upon said apparatus in such relation to said positioning means that while said case is disposed upon said positioning means said first gate member closes the side opening of said recess and contacts and guides the film across said recess during the longitudinal feeding movement thereof and is disposed between the film and said recess, and a second gate member disposed in opposite and parallel relation to said first gate member for holding the film in operative relation thereto.

43. In combination, cinematographic apparatus and a film carrying case for use therewith, said case comprising a substantially flat container having parallel top and bottom walls joined by side walls at substantially right angles thereto, one of said side walls having aligning openings therein for exposing a length of film therebetween and being formed with a recess in said last previously mentioned side wall between such openings across the side opening of which recess such exposed length of film extends, said apparatus including means for predeterminedly positioning said case thereupon and a film contacting structure, which forms a portion of the path through which the film is fed in said apparatus, and is so formed and positioned that it laterally guides such exposed length of film into said path while the case is being positioned upon said apparatus and longitudinally guides the film along said path between said openings during the feeding operation while said case is disposed upon said positioning means, said film contacting and guiding structure being so disposed upon said apparatus in relation to said positioning means that while said case is disposed upon said positioning means said structure closes the side opening of said recess.

44. In combination, cinematographic apparatus and a film carrying case for use therewith, said case comprising a substantially flat container having parallel top and bottom walls joined by side walls at substantially right angles thereto, one of said side walls having aligning openings therein for exposing a length of film therebetween and being formed with a recess in said last previously mentioned side wall between such openings across the side opening of which recess such exposed length of film extends, said apparatus including means for predeterminedly positioning said case thereupon, film guiding means, said film guiding means including an apertured film contacting member, said film containing member being so disposed upon said apparatus in relation to said positioning means that while said case is disposed upon said positioning means said film contacting member is disposed between the film and the side opening of said recess and closes said side opening and guides the film between said aligning openings, and a light reflecting element mounted upon said apparatus in cooperative relation to the aperture of said film contacting member and between said member and the inner periphery of said recess while said case is mounted upon said apparatus.

45. For use in a cinematographic apparatus including film engaging parts, a film-casing which serves simultaneously for protecting the film while storing or using the same and as a carrier in said apparatus, one of the outer walls of said casing being provided with aligning openings between which the film extends and said casing being formed with a recess therebetween and opposite which the exposed section of the film extends, and means for guiding the film both while the container is being placed upon said apparatus and after the container has been disposed thereupon and the film is being fed therethrough, said guiding means including a guiding finger mounted upon said apparatus and movable to a first position wherein it is adapted to enter said recess as said carrier is being placed upon said apparatus for positioning the film relative to the casing or to a second position wherein it engages one of the walls of the casing and hence serves as a means for clamping said casing upon said apparatus after it has been placed thereupon.

46. In combination, a film holder and a film handling apparatus, said film holder being constructed to house the winding-off coil and the take-up coil of a film and including one member which is detachable from the other parts of said holder whereby upon the detachment of said member a film may be placed within the holder or removed therefrom and having a portion of a wall opposite which a length of the film extends outside of the holder, and a clamp mounted upon said holder and movable from one position upon said holder wherein it connects said detachable member and the other parts of said holder and at the same time protects said external portion of the film, whereby the holder may be stored or moved outside of the film handling apparatus without danger of injury to said external portion of the film, and another position wherein it clears said external film portion whereby said portion may be engaged while said holder is positioned upon said apparatus, and said apparatus including means for positioning said holder thereupon, film contacting means for engaging said external portion of the film while said holder is positioned upon said apparatus, and means including a holding member movable to a position wherein it maintains said holder firmly fixed while said holder is positioned upon said apparatus and said length of film exposed for engagement by said film contacting means.

47. In combination, a film carrying case and two lengths of protective tape, said film carrying case being adapted to be inserted into a film handling apparatus for the exposure or projection of the film carried thereby or removed therefrom for the storage of the film, said case being provided with means for carrying each of the coils of the film and having two parallel top and bottom walls joined by side walls at approximately right angles thereto to protect both coils of the film, one of said side walls having aligning openings therein for exposing between said openings a length of that section of the film which extends between the coils, one of said lengths of protective tape having one end attached to one of said coil carrying means and its opposite end attached to one of the ends of the film, the other of said lengths having one end attached to the other of said coil carrying means and its opposite end attached to the other end of the film, each of said lengths being of sufficient dimension to extend from the coil carrying means to which it is attached out of the case through one of the aligning openings and into the case through the other of said aligning openings and to a point therewithin at which it is attached to one end of the film so that when the film comes to rest after the film has been wound upon either of the coils the protective tape and not the film will be exposed exteriorly of the case and the film itself will be entirely disposed within the casing.

GEORGE WILLIAM FORD.